3,621,763
FAN THRUST REVERSER ACTUATOR
Howard M. Geyer, Dayton, Ohio, assignor to Pneumo
  Dynamics Corporation, Cleveland, Ohio
Filed July 17, 1969, Ser. No. 842,660
Int. Cl. F01b 15/02; F15b 15/26
U.S. Cl. 92—17                                    11 Claims

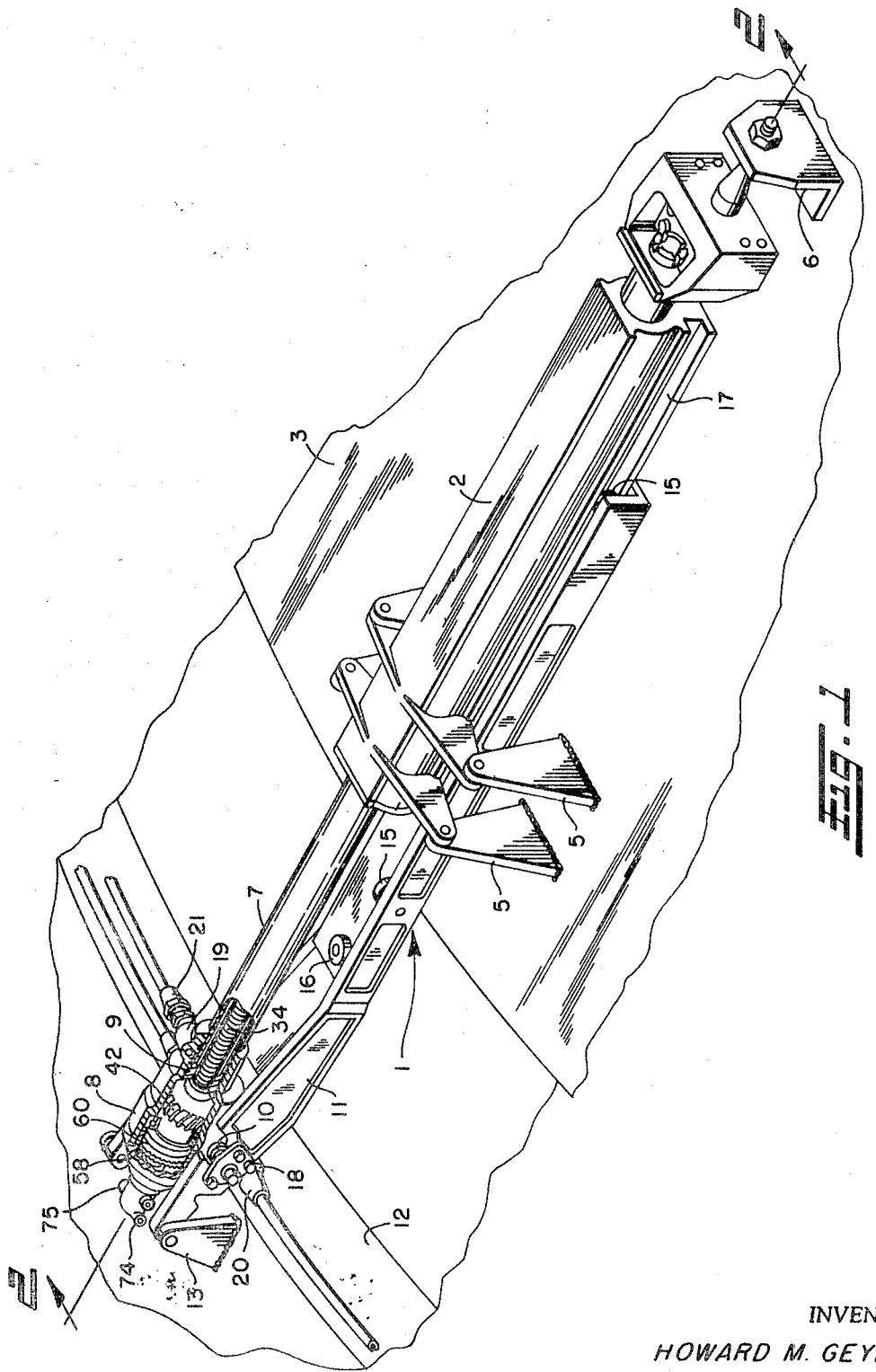

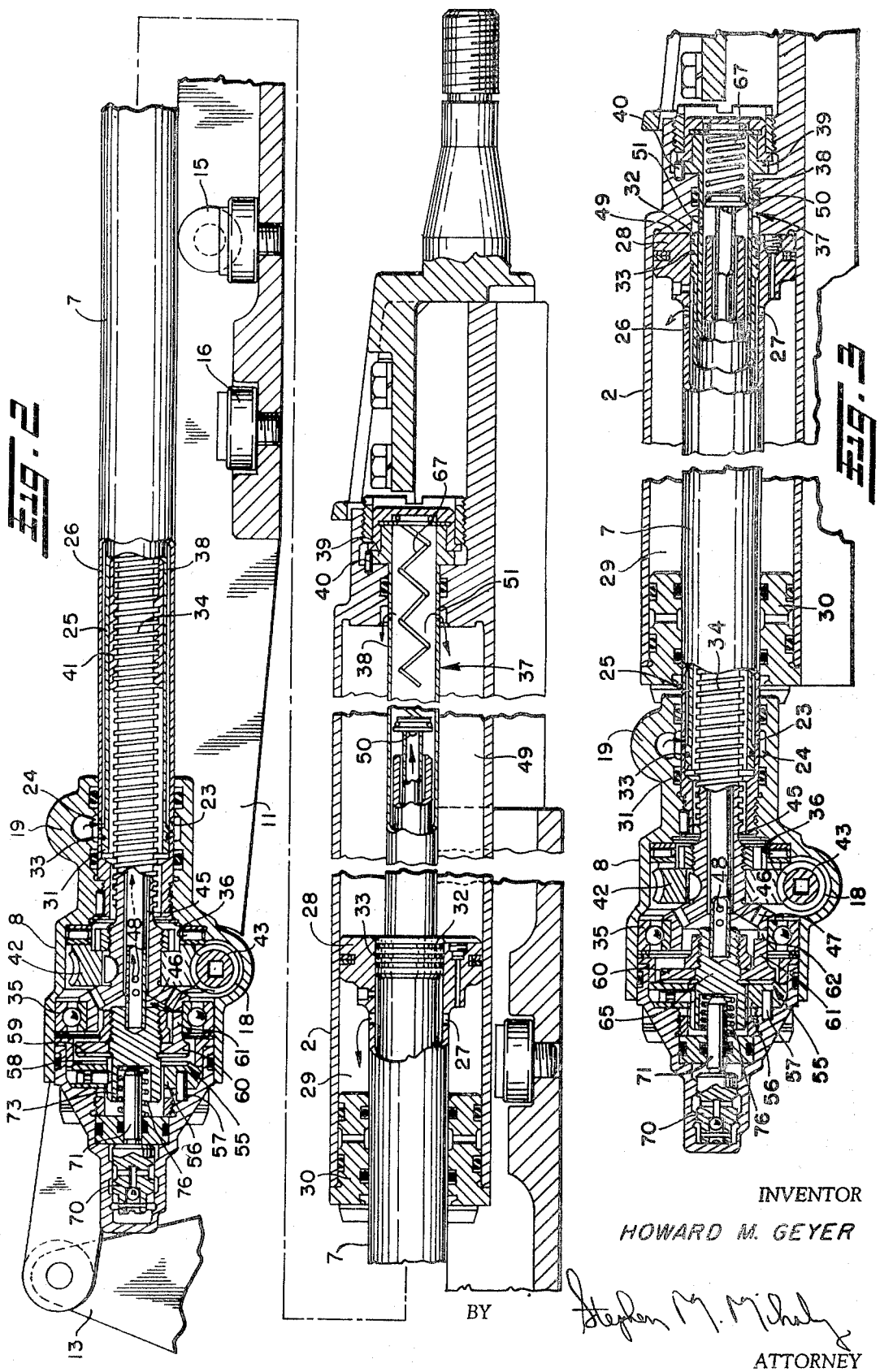

ABSTRACT OF THE DISCLOSURE

A fluid actuator in which the piston rod is fixed and the cylinder is movable, and all of the fluid connections for the cylinder are through the fixed piston rod. Synchronizing and locking mechanisms are also contained in the fixed piston rod so that their connections may also be through the fixed piston rod.

BACKGROUND OF THE INVENTION

The present invention relates to fluid actuators for use in fan thrust reverser systems for aircraft and the like in which the actuator cylinder rather than the piston rod moves, and the synchronizing and locking mechanisms as well as the fluid porting connections are fixed and contained within the fixed piston rod.

In previous known fluid actuators of this general type, the actuator cylinder is usually fixed to a stationary support and the piston rod is connected to the movable member. However, there are occasions when due to space requirements and other factors it is desirable or necessary to fix the piston rod and mount the cylinder on the movable member. In that event, the normal fluid connections to the cylinder must accommodate movements thereof, as must the usual connections for the synchronizing and locking mechanisms for the actuator, which increases the cost and complexity of the system as well as the chances for failure.

The usual locking mechanism for such actuators is itself quite complex and precludes movement of the actuator under load only when fluid pressure is interrupted to the actuating cylinder, thus making it entirely unsuitable for an actuator system in which it is desirable to control the locking mechanism independently of whether or not the cylinder is pressurized. A common form of locking mechanism also precludes movement of the actuator under load only when it has reached its fully extended position. This means that if a failure should occur in the fluid actuating system when the actuator is retracted, a tension load applied to the actuator will cause movement to the fully extended position, even though such movement may not be desirable.

SUMMARY OF THE INVENTION

With the foregoing in mind, it is a principal object of this invention to provide an actuator in which the cylinder is movable and all of the fluid connections therefor are through the fixed piston rod.

Another object is to provide an actuator with a relatively simple locking mechanism for releasably retaining the actuator cylinder in the fully retracted position unaffected by force applied to the cylinder.

Still another object is to provide an actuator in which the synchronizing and locking mechanisms are contained in the fixed piston rod to provide a fixed mounting therefor.

A further object is to provide a novel channel track arrangement for guiding the actuator cylinder during its movements.

BRIEF DESCRIPTION OF DRAWINGS

In the annexed drawings:
FIG. 1 is an isometric view of a preferred form of fluid actuator in accordance with this invention shown in the extended position with the piston rod fixed to a stationary member and the actuator cylinder attached to a movable member;
FIG. 2 is an enlarged longitudinal section through the actuator of FIG. 1; and
FIG. 3 is a fragmentary longitudinal section similar to FIG. 2, but showing the actuator in the fully retracted position with the cylinder locked against movement toward the extended position.

DESCRIPTION OF THE PREFERRED EMBODIMENT

In FIG. 1 there is shown a fluid actuator generally indicated by the reference numeral 1, with its cylinder 2 fixedly mounted at both its forward and aft ends to a thrust reverser sleeve 3 or other movable part as by means of suitable mounting brackets 5 and 6. Extending outwardly from the forward end of the cylinder 2 is a piston rod 7 having a housing 8 suitably connected to its outermost end 9. Trunnions 10 project outwardly from opposite sides of the housing 8 for pivotal mounting of the piston rod 7 to a channel track 11 which is fixed to the stationary member 12 of an aircraft or other structure by suitable brackets 13. The track 11 extends beneath the cylinder 2 for guiding the movements of the cylinder 2 and thrust reverser sleeve 3 toward and away from the stationary member 12 upon actuation of the cylinder 2 in a manner to be subsequently explained. Rollers 15 and 16 mounted on the sides and bottom of the channel track 11 engage longitudinal grooves 17 in the sides and bottom of the cylinder 2 to provide rolling contact therebetween.

Fluid for actuating the cylinder 2 between the fully extended position shown in FIGS. 1 and 2 and the fully retracted position shown in FIG. 3 is supplied to the appropriate ends of the cylinder through the extend port 18 and retract port 19 in the housing 8 and associated passages in the piston rod 7, whereby the fluid connections 20 and 21 to the extend port 18 and retract port 19 are stationary and therefor need not accommodate movements of the cylinder. As clearly shown in FIGS. 2 and 3, the fluid entering the retract port 19 passes into the interior of the piston rod 7 through radial openings 23 in line with an annular groove 24 in the housing 8. Contained within the piston rod 7 is a porting tube 25 which provides an annular clearance 26 with the piston rod 7 for discharge of the fluid entering the radial openings 23 through similar radial openings 27 in the piston rod 7 adjacent the forward end of the piston head 28. Such discharging fluid pressurizes the retract chamber 29 between the piston head 28 and the cylinder gland 30 at the forward end of the cylinder, thus to move the cylinder 2 and thrust reverser sleeve 3 attached thereto toward the left or retract position shown in FIG. 3. The porting tube 25 has enlarged ends 31 and 32 beyond the radial openings 23 and 27, respectively, with suitable seals 33 between the piston rod 7 and such enlarged ends to preclude leakage of fluid therepast.

Also mounted in the piston rod 7 is a synchronizing screw 34 having one end journalled in suitable bearings 35 and 36 in the housing 8 and extending into the forward end of the porting tube 25. Extending into the opposite end of the porting tube 25 is a synchronizing screw nut assembly 37 consisting of a tubular portion 38 having a flange 39 at its outer end pin-mounted at 40 to the aft end of the cylinder 2 to preclude rotation thereof, and containing a high lead acme nut 41 at its forward end in mating engagement with the synchronizing screw 35. The synchronizing screw 34 has a worm wheel 42 keyed to its forward end which mates with a bearing mounted worm 43 conveniently located in the extend port 18. Slidably received in a central longitudinal opening 45 in the synchronizing screw 34 is a lock actuating tube 46, the purpose of which will be subsequently explained.

To extend the cylinder 2 and thrust reverser sleeve 3 attached thereto toward the right to the fully extended position shown in FIGS. 1 and 2, fluid pressure is supplied to the extend port 18, from whence it is conducted through openings 47 and 48 in the worm wheel 42 and lock actuating tube 46 for flow to the aft end of the cylinder and discharge into the extend chamber 49 between the piston head 28 and aft end of the cylinder through radial holes 50 and 51 in the lock actuating tube 46 and synchronizing screw nut assembly 37, respectively. Such extend fluid also flows past the worm 43 and around the worm wheel 42 for passage along and through the synchronizing screw 34 to the extend chamber 49.

In operation, fluid pressure is always desirably maintained in the retract port 19 tending to urge the cylinder 2 toward the retracted position of FIG. 3. However, application of fluid pressure to the extend port 18 will cause the cylinder 2 to move to the fully extended position of FIGS. 1 and 2 despite the continued pressure in the retract port 19 because of the unbalanced piston head 28 area. Movement of the cylinder 2 in either direction causes a corresponding movement of the nut 41 because of its attachment to the cylinder by means of the tubular portion 38 as aforesaid, thus to rotate the synchronizing screw 35 in one direction or the other, which in turn drives the worm wheel 42 and worm 43 in such a manner that the speed and position of the worm is proportional to that of the cylinder. By tying the worms 43 of plural actuators together through flexible shafts keyed to each worm, such actuators will be caused to move together in mechanical synchronization.

For locking the cylinder 2 in the fully retracted position of FIG. 3, there is provided a locking mechanism 55 which is desirably contained in the fixed housing 8 of the fixed piston rod 7 so that its fluid connections are stationary. As can be seen in both FIGS. 2 and 3, such locking mechanism 55 consists of a stationary clutch plate 56 fixed to the housing 8 by pins 57 and having dog teeth 58 on one face engageable with similar dog teeth 59 on the opposed face of a rotatable clutch plate 60 keyed to the synchronizing screw 34 for rotation together while permitting relative axial movement therebetween by means of a projection 61 on the clutch plate 60 extending into a longitudinal slot 62 in the synchronizing screw 34. The clutch plate 60 is carried by a bushing 65 brazed or otherwise secured to the forward end of the lock actuating tube 46. A lock spring 67 at the aft end of the cylinder 2 urges the lock actuating tube 46 and thus the rotatable clutch plate 60 toward the stationary clutch plate 56 when the cylinder 2 is in the fully retracted position (FIG. 3), thus to lock the clutch plate 60 and synchronizing screw 35 against rotation due to overlapping engagement between the dog teeth 58 and 59. Since the synchronizing screw 35 is no longer free to rotate, the cylinder 2 will remain stationary despite the application of high fluid pressure to the extend port 18 or a tension load to the cylinder.

To release the locking mechanism 55, a piston 70 is provided in the housing 8 forward of the movable clutch plate 60. The piston 70 has a plunger portion 71 extending through a central opening in the stationary clutch plate 56 for engagement in a recess 73 in the forward end of the bushing 65. When fluid pressure is supplied to the lock-in port 74 in the forward end of the housing 8 (see FIG. 1), the piston 70 forces the lock actuating tube 46 to the rear thus compressing the spring 67 and moving the clutch plate 60 in the same direction until its teeth 59 clear the teeth 58 on the stationary clutch plate 56 as shown in FIG. 2. Now the synchronizing screw 35 is free to rotate, and accordingly fluid pressure supplied to the extend port 18 will cause the cylinder 2 to move toward the thrust reverse position of FIGS. 1 and 2.

The fluid pressure which is supplied to the lock-in port 74 may also be supplied to additional actuators through a lock-out port 75 located directly opposite the lock-in port 74 (see FIG. 1) to prevent inadvertent extend pressure from being supplied to one actuator of a series until all of the locking mechanisms are unlocked and the actuators are ready to move to the thrust reverse position. After the cylinder 2 has moved sufficiently toward the right to relieve the load of the lock spring 67, the locking mechanism 55 will no longer engage and the thrust reverser sleeve 3 is free to move to the full reverse position under the influence of a tension load such as an aerodynamic aiding load. Fluid pressure may then be cut off to the lock-in port 74, but in that event it is desirable to provide a weak spring 76 between the clutch plate 60 and housing 8 to prevent the dog teeth 59 on the clutch plate 60 from skipping across the peaks of the teeth 58 on the stationary clutch plate 56.

When fluid pressure is supplied to the retract port 19 to return the cylinder 2 to the fully retracted position, the movable clutch plate 60 will not engage the stationary clutch plate 56 until the cylinder 2 approaches the end of its stroke and the lock spring 67 is sufficiently compressed to overcome the small force of the spring 75. By providing low ramp angles on the engaging teeth 58 and 59 of the stationary clutch plate 56 and movable clutch plate 60, the movable clutch plate 60 will continue to ratchet over the stationary clutch plate 56 until all movement of the cylinder toward the retract position has ceased.

From the above discussion, it can now be seen that the fluid actuator of the present invention effectively permits mounting of the actuator cylinder on a movable part and fixing of the piston rod without requiring movable fluid connections, since all of the fluid connections are through the fixed piston rod. The synchronizing and lock mechanisms are also contained in the fixed piston rod, whereby their connections may also be fixed.

I, therefore, particularly point out and distinctly claim as my invention:

1. A fluid actuator comprising a cylinder adapted to be mounted on a movable part, a piston axially movable within said cylinder, a piston rod extending from said piston outwardly from one end of said cylinder adapted to be mounted on a fixed part, and first passage means in said piston rod having fluid communication with one end of said cylinder for connection to a fluid pressure source through said piston rod, whereby the connection of said one end of said cylinder to a fluid pressure source will remain substantially stationary during movements of said cylinder with respect to said piston rod, a synchronizing screw contained within said piston rod, mounting said synchronizing screw for rotation during relative axial movement of said cylinder with respect to said piston rod, and means driven by said synchronizing screw at a rate proportional to the speed and position of said cylinder for permitting mechanical synchronization of a plurality of such actuators, locking means adjacent the outer end of said piston rod for retaining said synchronizing screw against rotation when said cylinder is fully retracted in the direction of the outer end of said piston rod for locking said cylinder in such fully retracted position despite the application of force to said cylinder tending to move said cylinder in the opposite direction, and means for releasing said locking means to permit such force to move said cylinder in the opposite direction, said locking means comprising a stationary clutch plate, a movable clutch plate keyed to said synchronizing screw for rotation therewith while permitting relative axial movement of said movable clutch plate with respect to said synchronizing screw, a lock actuating tube extending from said movable clutch plate through a longitudinal opening in said synchronizing screw, and spring means interposed between said cylinder and lock actuating tube which is compressed upon movement of said cylinder to the retracted position to urge said movable clutch plate into engagement with said stationary clutch plate.

2. The actuator of claim 1 wherein said means for releasing said locking means comprises a fluid actuated piston engageable with said lock actuating tube for moving said locking actuating tube and movable clutch plate away from said stationary clutch plate against said spring means for disengaging said movable clutch plate from said stationary clutch plate.

3. The actuator of claim 2 wherein said spring means is relieved during movement of said cylinder in the opposite direction, and a weak spring means is provided for maintaining said movable clutch plate out of engagement with said stationary clutch plate when said spring means is relieved, whereby said means for releasing said locking means need only be actuated during the initial movement of said cylinder in such opposite direction.

4. A fluid actuator comprising a cylinder, a piston axially movable within said cylinder, a piston rod extending from said piston outwardly from one end of said cylinder, means for selectively supplying fluid pressure to opposite ends of said cylinder for effecting relative axial movement between said cylinder and piston rod, a screw shaft contained within said piston rod, means mounting said screw shaft for rotation during such relative axial movement between said cylinder and piston rod, locking means for retaining said screw shaft against rotation upon relative movement of said cylinder and piston rod to the fully retracted position for locking said cylinder and piston rod in such fully retracted position despite the application of force to said cylinder tending to move said cylinder and piston rod relative to each other in the opposite direction, and means for releasing said locking means to permit such force to cause relative movement between said cylinder and piston rod in the opposite direction, said locking means comprising a stationary clutch plate, a movable clutch plate keyed to said screw shaft for rotation therewith while permitting relative axial movement of said movable clutch plate with respect to said screw shaft, a lock actuating tube extending from said movable clutch plate through a longitudinal opening in said screw shaft, and spring means which is compressed upon relative movement of said cylinder and piston rod to the fully retracted position to urge said movable clutch plate into engagement with said stationary clutch plate.

5. The actuator of claim 4 wherein said spring means is relieved during movement of said cylinder in the opposite direction, and a weak spring means is provided for maintaining said movable clutch plate out of engagement with said stationary clutch plate when said spring means is relieved, whereby said means for releasing said locking means need only be actuated during the initial movement of said cylinder in such opposite direction.

6. The actuator of claim 4 wherein said means for releasing said locking means comprises a fluid actuated piston engageable with said lock actuating tube for moving said lock actuating tube and movable clutch plate away from said stationary clutch plate against said spring means for disengaging said movable clutch plate from said stationary clutch plate.

7. A fluid actuator comprising a cylinder, a piston axially movable within said cylinder, a piston rod extending from said piston outwardly from one end of said cylinder, means for selectively supplying fluid pressure to opposite ends of said cylinder for effecting relative axial movement between said cylinder and piston rod, a screw shaft contained within said piston rod, means mounting said screw shaft for rotation during such relative axial movement between said cylinder and piston rod, locking means for retaining said screw shaft against rotation upon relative movement of said cylinder and piston rod to the fully retracted position for locking said cylinder and piston rod in such fully retracted position despite the application of force to said cylinder tending to move said cylinder and piston rod relative to each other in the opposite direction, and means for releasing said locking means to permit such force to cause relative movement between said cylinder and piston rod in the opposite direction, said locking means comprising a stationary clutch plate, a movable clutch plate keyed to said screw shaft for rotation therewith while permitting relative axial movement of said movable clutch plate with respect to said screw shaft, and spring means which is compressed upon movement of said cylinder to the retracted position to urge said movable clutch plate into engagement with said stationary clutch plate, said spring means being relieved during movement of said cylinder in the opposite direction.

8. The actuator of claim 7 further comprising a weak spring means for maintaining said movable clutch plate out of engagement with said stationary clutch plate when said spring means is relieved, whereby said means for releasing said locking means need only be actuated during the initial movement of said cylinder in such opposite direction.

9. A fluid actuator comprising a cylinder adapted to be mounted on a movable part, a piston axially movable within said cylinder, a piston rod extending from said piston outwardly from one end of said cylinder adapted to be mounted on a fixed part, and first passage means in said piston rod having fluid communication with one end of said cylinder for connection to a fluid pressure source through said piston rod, whereby the connection of said one end of said cylinder to a fluid pressure source will remain substantially stationary during movements of said cylinder with respect to said piston rod, a synchronizing screw contained within said piston rod, means mounting said synchronizing screw for rotation during relative axial movement of said cylinder with respect to said piston rod, and means driven by said synchronizing screw at a rate proportional to the speed and position of said cylinder for permitting mechanical synchronization of a plurality of such actuators, locking means adjacent the outer end of said piston rod remote from said piston for retaining said synchronizing screw against rotation when said cylinder is fully retracted in the direction of the outer end of said piston rod for locking said cylinder in such fully retracted position despite the application of force to said cylinder tending to move said cylinder in the opposite direction, and means for releasing said locking means to permit such force to move said cylinder in the opposite direction, said locking means comprising a stationary clutch plate, a movable clutch plate keyed to said screw shaft for rotation therewith while permitting relative axial movement of said movable clutch plate with respect to said screw shaft, spring means which is compressed upon movement of said cylinder to the retracted position to urge said movable clutch plate into engagement with said stationary clutch plate, said spring means being relieved during movement of said cylinder in the opposite direction, and a weak spring means for maintaining said movable clutch plate out of engagement with said stationary clutch plate when said spring means is relieved, whereby said means for releasing said locking means need only be actuated during the initial movement of said cylinder in such opposite direction.

10. The actuator of claim 9 further comprising additional passage means in said piston rod having fluid communication with the other end of said cylinder for connection to a fluid pressure source, whereby the connections of both ends of said cylinder to a fluid pressure source will remain stationary during movements of said cylinder with respect to said piston rod, said additional passage means extending through said synchronizing screw to the aft end of said cylinder.

11. The actuator of claim 9 further comprising a channel track to which the outer end of said piston rod is connected, said channel track extending along said cylinder for guiding its movement toward and away from said outer end of said piston rod, said channel track having rollers engageable in longitudinal grooves in said cylinder to provide rolling contact therebetween.

References Cited

UNITED STATES PATENTS

| | | | |
|---|---|---|---|
| 2,442,577 | 6/1948 | Ashton | 92—24 X |
| 2,660,027 | 11/1953 | Geyer | 92—24 X |
| 2,660,028 | 11/1953 | Geyer | 92—27 X |
| 2,886,008 | 5/1959 | Geyer et al. | 92—24 X |
| 3,075,503 | 1/1963 | Kimsey | 92—28 X |
| 3,202,000 | 8/1965 | Fischer | 92—117 X |
| 3,397,735 | 8/1968 | Taccone | 92—117 X |
| 3,425,322 | 2/1969 | Zucchellini | 92—117 X |
| 3,477,229 | 11/1969 | Katko | 92—117 X |
| 3,003,470 | 10/1961 | Geyer | 92—17 |

MARTIN P. SCHWADRON, Primary Examiner

C. SCHIMIKOWSKI, Assistant Examiner

U.S. Cl. X.R.

92—24, 27, 117